United States Patent
Procyk et al.

(10) Patent No.: US 6,986,007 B1
(45) Date of Patent: Jan. 10, 2006

(54) DISK DRIVE COMPRISING AN ASYNCHRONOUS PARTITION LOCATED ON A DISK BETWEEN TWO ISOCHRONOUS PARTITIONS

(75) Inventors: Richard J. Procyk, Laguna Niguel, CA (US); Dzanh Nguyen, Garden Grove, CA (US); Giao N. Tran, Cerritos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 503 days.

(21) Appl. No.: 10/010,671

(22) Filed: Nov. 30, 2001

(51) Int. Cl.
G06F 12/00 (2006.01)
H04N 5/92 (2006.01)

(52) U.S. Cl. ........................ 711/154; 386/95; 369/30.03
(58) Field of Classification Search ............... 369/30.03
See application file for complete search history.

(56) References Cited

U.S. PATENT DOCUMENTS

| | | | |
|---|---|---|---|
| 4,142,209 A * | 2/1979 | Hedlund et al. ............... 386/95 |
| 4,229,808 A * | 10/1980 | Hui .......................... 369/53.14 |
| 5,430,553 A * | 7/1995 | Misono et al. ............... 386/106 |
| 5,802,059 A * | 9/1998 | Hayashi ...................... 370/429 |
| 6,115,771 A * | 9/2000 | Born ............................ 710/315 |
| 6,141,702 A * | 10/2000 | Ludtke et al. .................. 710/5 |
| 6,292,844 B1 * | 9/2001 | Smyers et al. .................. 710/5 |
| 6,341,196 B1 * | 1/2002 | Ando et al. .................... 386/95 |
| 6,366,980 B1 * | 4/2002 | Haines et al. ............... 711/112 |
| 6,385,711 B1 * | 5/2002 | Colligan ..................... 711/170 |
| 6,430,635 B1 * | 8/2002 | Kwon et al. ................. 710/104 |
| 6,453,110 B1 * | 9/2002 | Kawamura et al. ........... 386/46 |
| 6,477,589 B1 * | 11/2002 | Suzuki et al. ................. 710/18 |
| 6,523,058 B1 * | 2/2003 | Fung et al. .................. 718/100 |
| 6,593,937 B2 * | 7/2003 | Smyers et al. ............... 345/629 |
| 6,721,818 B1 * | 4/2004 | Nakamura ..................... 710/9 |
| 6,721,859 B1 * | 4/2004 | Smyers ...................... 711/154 |

FOREIGN PATENT DOCUMENTS

WO    WO 01/29679 A1    4/2001

* cited by examiner

*Primary Examiner*—A M Psitos
(74) *Attorney, Agent, or Firm*—Howard H. Sheerin, Esq.

(57) ABSTRACT

A disk drive is disclosed comprising a disk having an asynchronous partition and a first and second isochronous partition, wherein the asynchronous partition is located between the first and second isochronous partitions in order to reduce the seek time for the disk drive when seeking between the asynchronous and isochronous partitions.

12 Claims, 6 Drawing Sheets

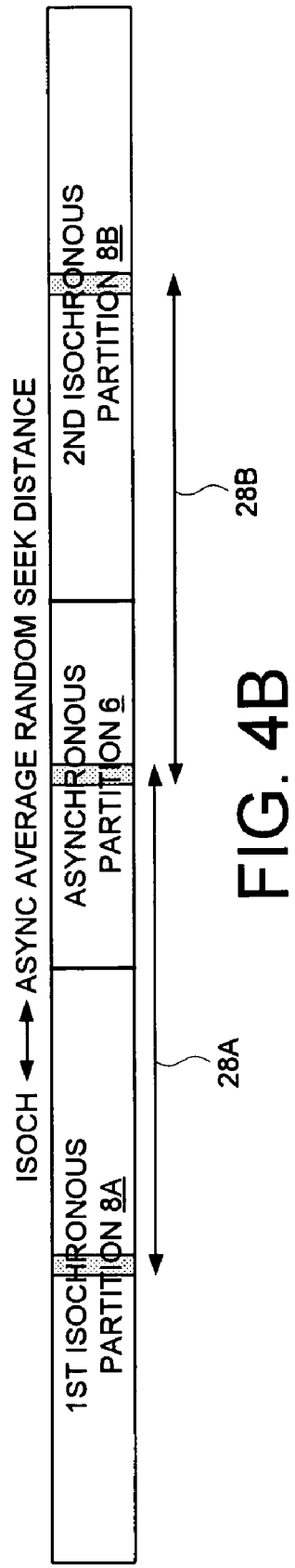

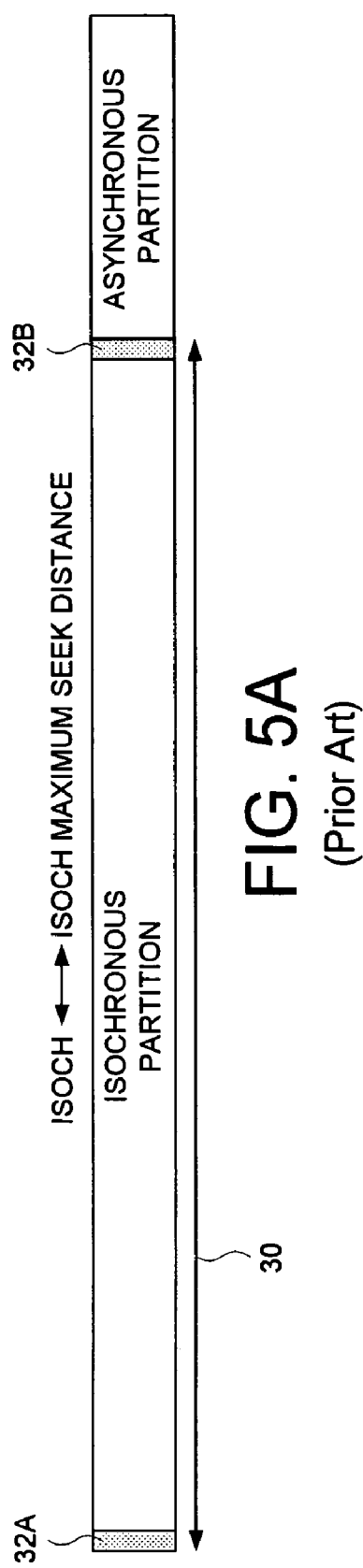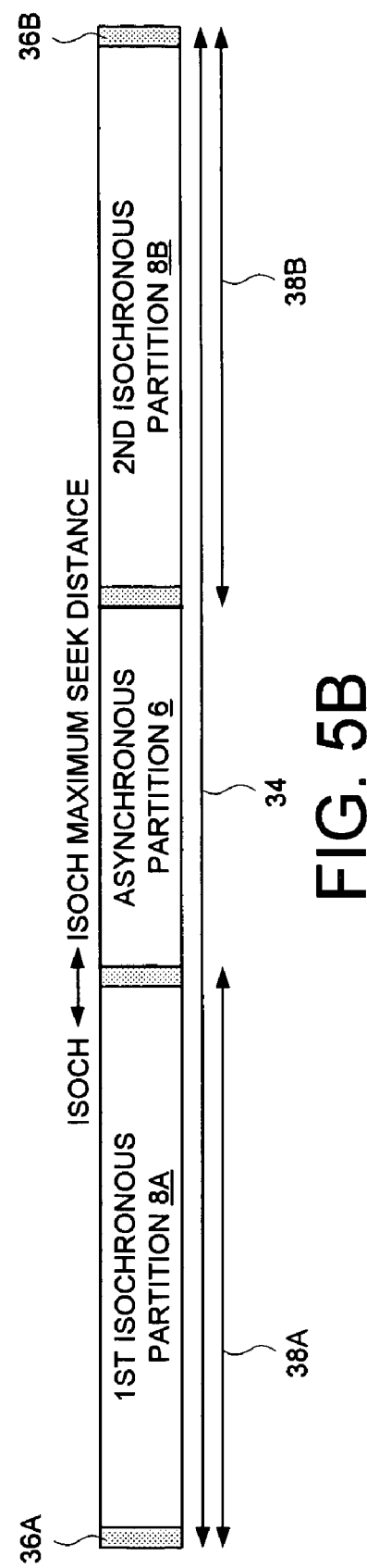

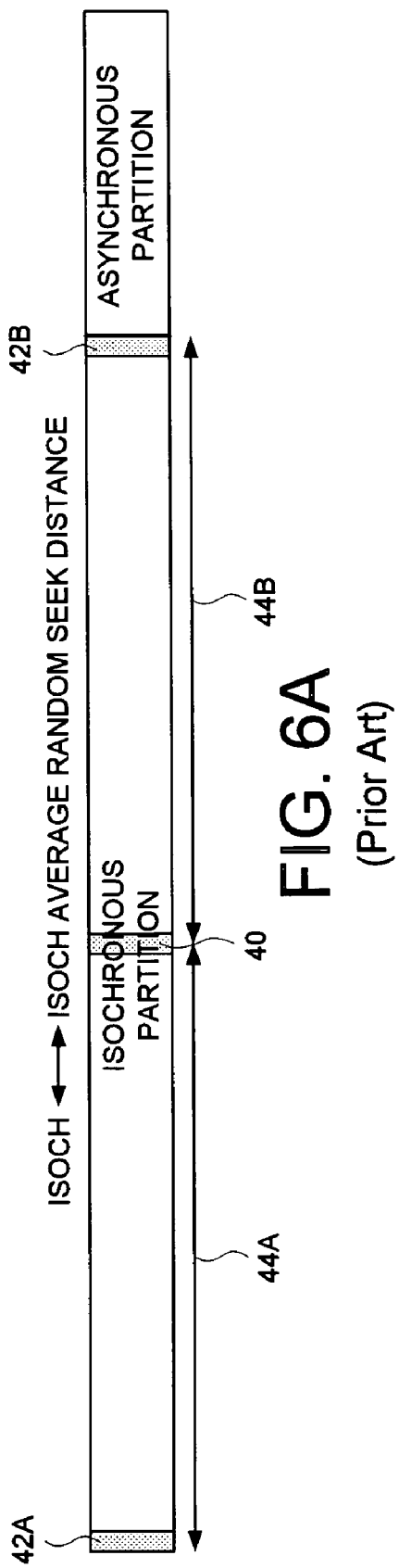
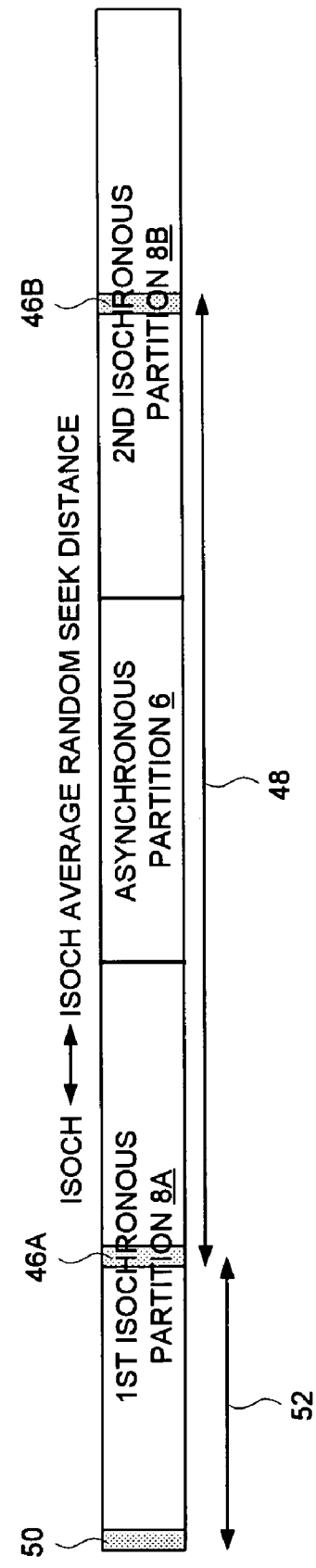

DISK DRIVE COMPRISING AN ASYNCHRONOUS PARTITION LOCATED ON A DISK BETWEEN TWO ISOCHRONOUS PARTITIONS

BACKGROUND OF THE INVENTION

1. Field of the Invention

The present invention relates to disk drives. More particularly, the present invention relates to a disk drive comprising an asynchronous partition located on a disk between two isochronous partitions.

2. Description of the Prior Art

Disk drives may store both asynchronous and isochronous data. Asynchronous data is transferred to and from the disk drive within a "best-effort" time interval, whereas isochronous data is transferred to and from the disk drive within a "time-constrained" time interval. An example of isochronous data is audio/video (AV) data transmitted from the disk drive to a monitor for viewing. The AV data must be transmitted within a prescribed time interval in order to avoid interruptions during the viewing session. An example of asynchronous data is user application data, such as word processing documents, accounting documents, etc., manipulated by an end user of a host computer. The transfer of asynchronous data to a host computer can be interrupted (within some maximum time-out period) without significantly degrading the performance of the host application.

Disk drives also typically employ error correction code (ECC) circuitry for correcting errors on-the-fly in both the isochronous and asynchronous data. If the ECC circuitry is unable to correct errors in asynchronous data, the disk drive typically performs various firmware retry procedures in an attempt to correct the errors. The latency of the firmware retry procedures is tolerated since it does not significantly degrade the performance of the host application while ensuring the host application receives error-free data. If asynchronous data cannot be recovered using the retry procedures, the disk drive responds with an error message rather than transfer bad data to the host computer. In contrast, if the ECC circuitry is unable to correct errors in isochronous data, the isochronous time constraints typically preclude using the firmware retry procedures to correct the errors. This is not a significant problem since occasional errors in the isochronous data do not significantly degrade the performance of the typical isochronous application, such as streaming AV data to a monitor. Therefore the isochronous data, including the errors, is typically transmitted by the disk drive to the host computer rather than respond with an error message.

The disk within an isochronous/asynchronous disk drive is typically divided into an isochronous partition for storing the isochronous data and an asynchronous partition for storing the asynchronous data. An isochronous communication protocol, such as the AV/C protocol, is used to access the isochronous partition according to the specified time constraints, and an asynchronous communication protocol, such as the SBP-2 protocol, is used to access the asynchronous partition in a best-effort manner. The asynchronous communication protocol may also be used to access the isochronous data in a best-effort manner, for example, to edit a selected portion of a video program.

It is desirable to support the concurrent (interleaved) transfer of both asynchronous and isochronous data to and from the disk drive. If the isochronous and asynchronous partitions are contiguous as illustrated in FIG. 1, the maximum seek distance may be from the inner diameter track of the disk to the outer diameter track. If the disk drive is directed to make multiple interleaved accesses to data located at the ends of the partitions, the cumulative seek times may interfere with access to the time-constrained isochronous data. In addition, if the disk drive is required to frequently seek between the asynchronous and isochronous data in order to satisfy the isochronous time constraints, performance in accessing the asynchronous partition may degrade.

There is, therefore, the need to ameliorate the inherent latency of seek times in a disk drive which can interfere with the time-constrained access of isochronous data while concurrently accessing asynchronous data.

SUMMARY OF THE INVENTION

The present invention may be regarded as a disk drive comprising a disk having an asynchronous partition and a first and second isochronous partition, wherein the asynchronous partition is located between the first and second isochronous partitions in order to reduce the seek time for the disk drive when seeking between the asynchronous and isochronous partitions. The disk drive further comprises a head actuated radially over the disk, and a disk controller. The disk controller is for writing data to and reading data from the first and second isochronous partitions according to a time-constrained protocol, and is for writing data to and reading data from the asynchronous partition according to a best-effort protocol.

In one embodiment, the time-constrained protocol employs the AV/C protocol, and the best-effort protocol employs the SBP-2 protocol.

In one embodiment, the disk drive further comprises offset parameters for identifying the beginning and end of the asynchronous partition. In one embodiment, the offset parameters comprise a first parameter identifying the beginning of the asynchronous partition and a second parameter identifying the end of the asynchronous partition. In another embodiment, the offset parameters comprise a first parameter identifying the beginning of the asynchronous partition and a second parameter identifying the size of the asynchronous partition.

In yet another embodiment, the disk comprises an AV file system for accessing the isochronous data.

The present invention may also be regarded as a method of accessing a disk drive. The disk drive comprises a disk and a head actuated radially over the disk. The disk comprises an asynchronous partition and a first and second isochronous partition. The method comprises the steps of using a time-constrained protocol to read isochronous data from at least one of the first and second isochronous partitions, and using a best-effort protocol to read asynchronous data from the asynchronous partition. The asynchronous partition is located on the disk between the first and second isochronous partitions in order to reduce the seek time for the disk drive when seeking between the asynchronous and isochronous partitions.

BRIEF DESCRIPTION OF THE DRAWINGS

FIG. 4A illustrates the average random seek distance when seeking between the isochronous and asynchronous partition for the prior art disk drive of FIG. 1.

FIG. 4B illustrates the average random seek distance when seeking between the isochronous and asynchronous partitions for the disk drive of FIG. 2.

FIG. 5A illustrates the maximum seek distance when seeking between the ends of the isochronous partition for the prior art disk drive of FIG. 1.

FIG. 5B illustrates the maximum seek distance when seeking between the ends of the isochronous partitions for the disk drive of FIG. 2.

FIG. 6A illustrates the average random seek distance when seeking between two AV streams stored in the isochronous partition for the prior art disk drive of FIG. 1.

FIG. 6B illustrates the average random seek distance when seeking between two AV streams stored in different as well as the same isochronous partition for the disk drive of FIG. 2.

DESCRIPTION OF THE PREFERRED EMBODIMENTS

Figure 2:
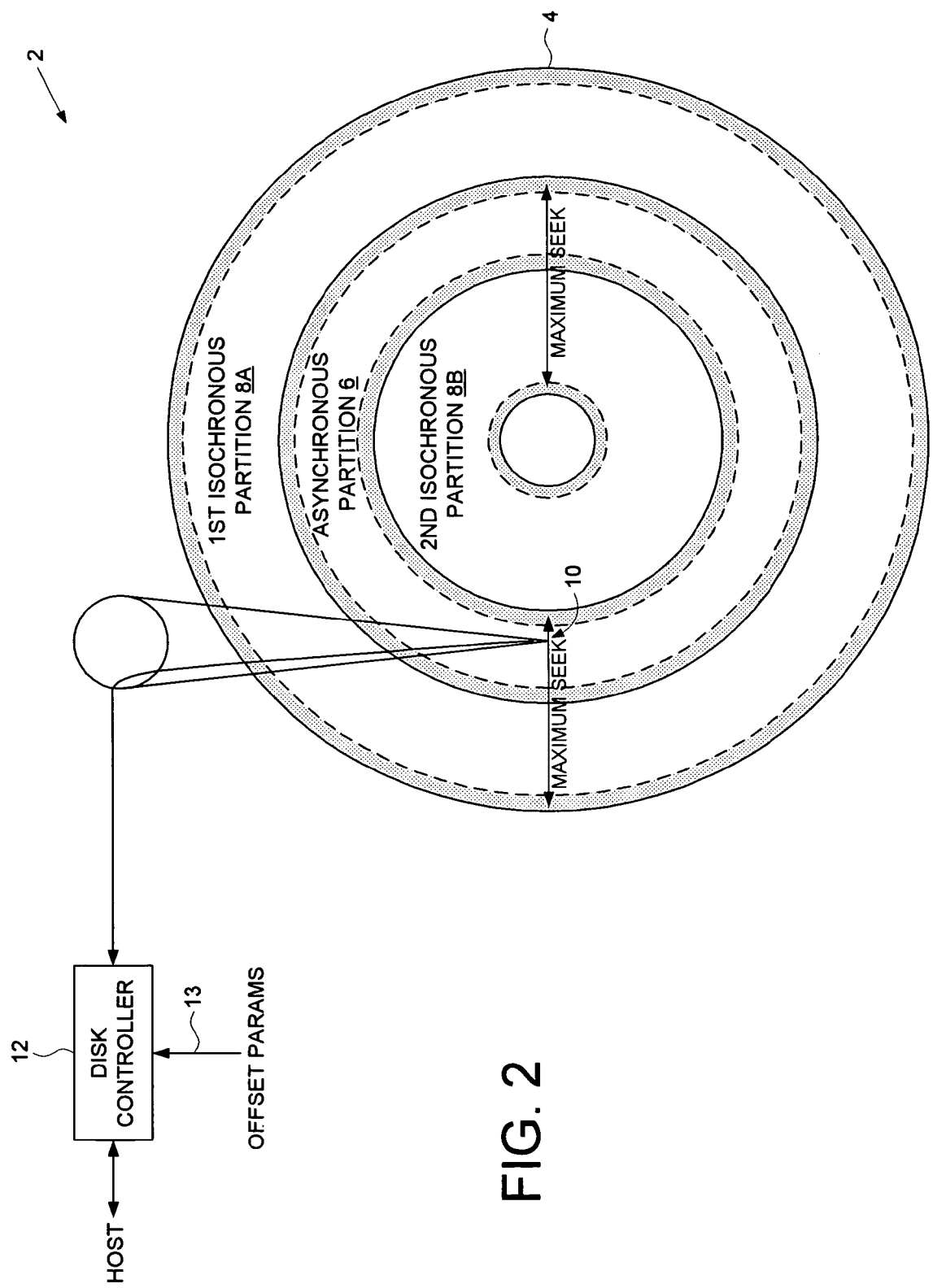
FIG. 2 shows a disk drive according to an embodiment of the present invention employing a disk having an asynchronous partition located between two isochronous partitions

FIG. 2 shows a disk drive 2 according to an embodiment of the present invention comprising a disk 4 having an asynchronous partition 6 and a first and second isochronous partition 8A and 8B, wherein the asynchronous partition 6 is located between the first and second isochronous partitions 8A and 8B in order to reduce the seek time for the disk drive 2 when seeking between the asynchronous 6 and isochronous partitions 8A and 8B. The disk drive 2 further comprises a head 10 actuated radially over the disk 4, and a disk controller 12. The disk controller 12 is for writing data to and reading data from the first and second isochronous partitions 8A and 8B according to a time-constrained protocol, and is for writing data to and reading data from the asynchronous partition 6 according to a best-effort protocol.

In one embodiment, the disk drive 2 further comprises offset parameters 13 for identifying the location of the asynchronous partition 6 with respect to the isochronous partitions 8A and 8B. In one embodiment, the offset parameters 13 comprise a first parameter identifying the beginning of the asynchronous partition 6 and a second parameter identifying the end of the asynchronous partition 6. In another embodiment, the offset parameters 13 comprise a first parameter identifying the beginning of the asynchronous partition 6 and a second parameter identifying the size of the asynchronous partition 6.

Any suitable time-constrained and best-effort protocol may be employed. In one embodiment, the time-constrained protocol employs the AV/C protocol, and the best-effort protocol employs the SBP-2 protocol. The AV/C protocol is used to communicate with audio/video equipment over an IEEE 1394 serial bus. The AV/C protocol uses the Function Control Protocol (FCP) defined by IEC-61883, the ratified international standard for the transport of audio/video command requests and responses. AV/C commands are transmitted through AV/C transactions consisting of an AV/C command frame addressed to the target node's FCP_Command register and zero or more AV/C response frames addressed to the requesting node's FCP_Response register.

The AV/C Disk Subunit Enhancements for Hard Disk Drive Specification is a technical specification of the 1394 Trade Association which includes enhancements to the AV/C protocol for managing the storage and retrieval of audio/video (AV) data. Under this specification, AV data is stored in the isochronous partitions 8A and 8B of the disk 4 in an AV track. An AV track comprises a plurality of data sectors in one or both of the isochronous partitions 8A and 8B for storing a stream of audio/video data. Each AV track is identified by a unique track ID in an entry of an embedded AV file system stored on the disk 4. The entries in the AV file system are treated as asynchronous data and accessed using a best-effort protocol to ensure the entries are transmitted error-free to the host computer. In one embodiment, the entries of the AV file system are duplicated to provide error correction redundancy.

The SBP-2 protocol for accessing the asynchronous partition employs Operation Request Blocks (ORBs) which identify areas of the asynchronous partition 6 to read or write in terms of Logical Block Addresses (LBAs). The disk controller 12 converts the LBAs into Physical Block Addresses (PBAs) which identify physical sectors within the asynchronous partition 6. The LBA to PBA addressing allows the disk drive 2 to "map-out" defective physical sectors using any suitable defect mapping scheme.

Figure 1:
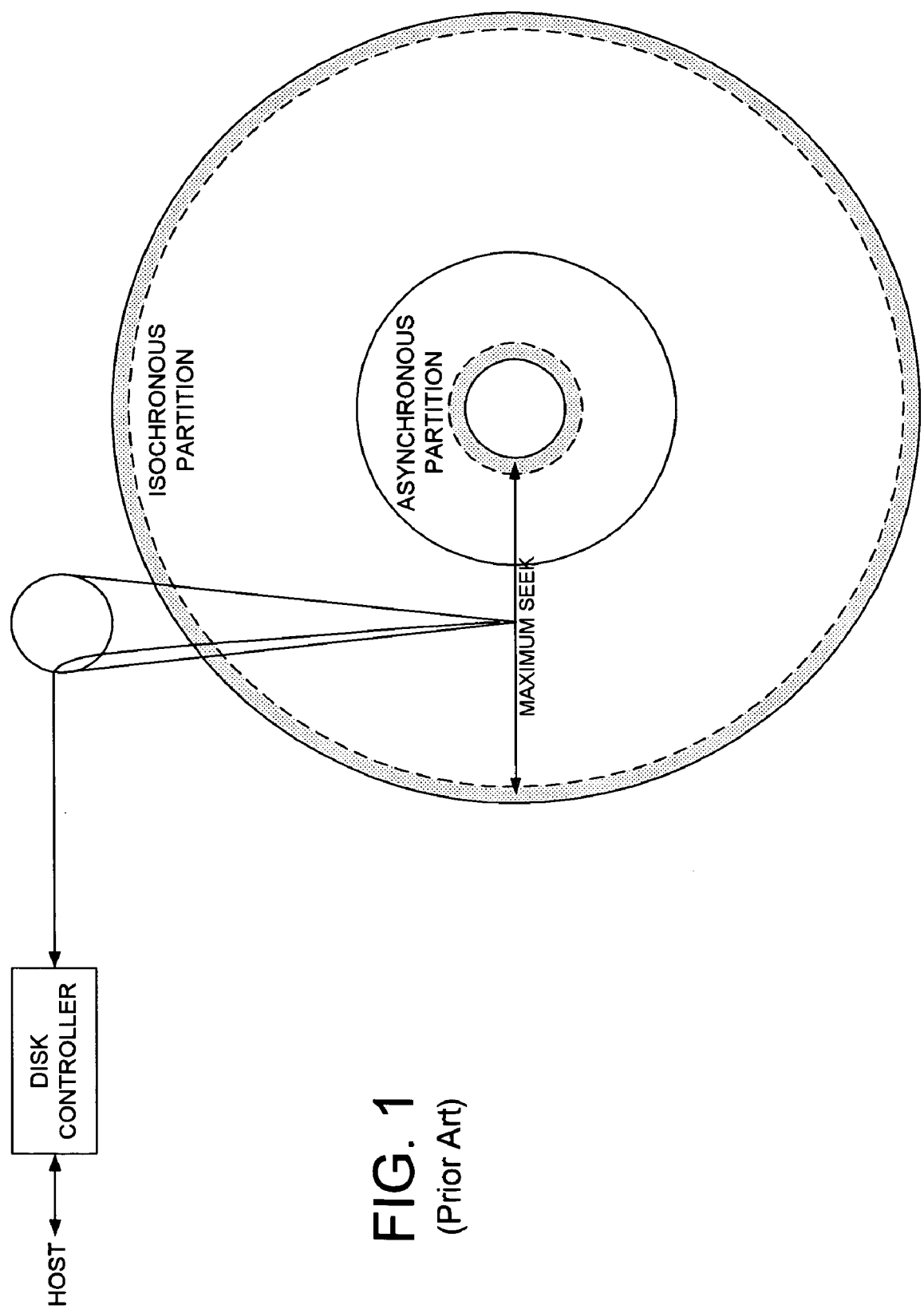
FIG. 1 shows a prior art disk drive and the maximum seek distance between an isochronous and asynchronous partition.
Figure 3A:
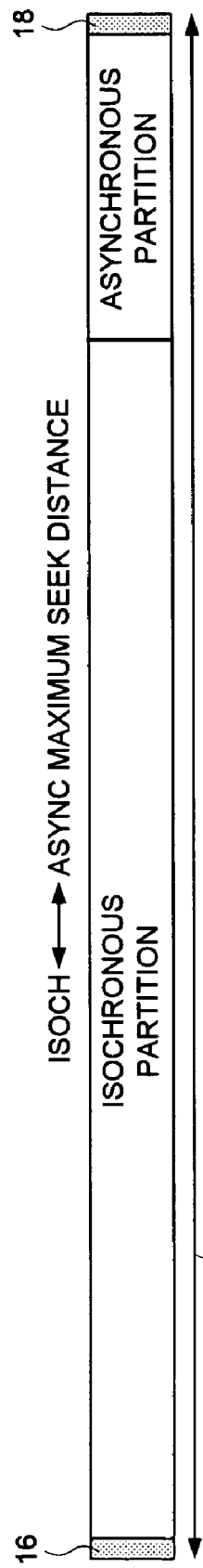
FIG. 3A illustrates the maximum seek distance when seeking between the isochronous and asynchronous partition for the prior art disk drive of FIG. 1.

FIG. 3A illustrates the maximum seek distance 14 when seeking between the isochronous and asynchronous partition for the prior art disk drive of FIG. 1. In this example, the disk drive is accessing an AV stream 16 at the extreme end of the isochronous partition, while concurrently accessing (in an interleaved manner) asynchronous data 18 stored at the extreme end of the asynchronous partition. Thus, the maximum seek distance 14 when seeking between the isochronous and asynchronous data requires the entire stroke of the actuator arm. The associated seek time may interfere with the time constraints of the isochronous data, particularly if the disk drive performs multiple consecutive seeks to the end of the asynchronous partition. In addition, the maximum seek distance 14 may degrade the performance in accessing the asynchronous data 18 if the disk drive is required to seek back and forth between the AV stream 16 in order to satisfy the isochronous time constraints.

Figure 3B:
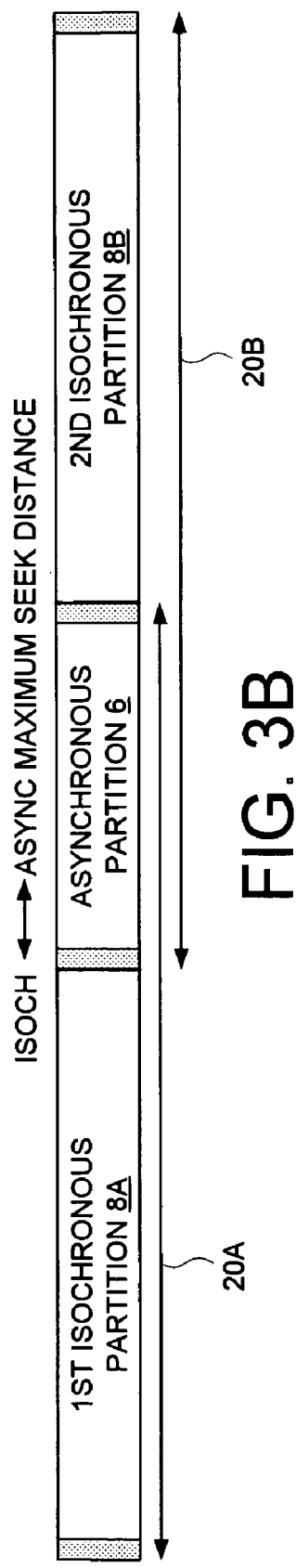
FIG. 3B illustrates the maximum seek distance when seeking between the isochronous and asynchronous partitions for the disk drive of FIG. 2.

FIG. 3B illustrates how in the embodiment of FIG. 2 locating the asynchronous partition 6 between two isochronous partitions 8A and 8B significantly reduces the maximum seek distance 20A and 20B when seeking between the isochronous and asynchronous partitions. In one embodiment, the isochronous partitions 8A and 8B are equal in size such that the maximum seek distances 20A and 20B are equal in length. Also in the embodiment of FIG. 3B, the asynchronous partition 6 is much smaller than the isochronous partitions 8A and 8B. Therefore the maximum seek distances 20A and 20B are reduced in comparison to FIG. 3A to essentially one half the stroke of the actuator arm (plus one-half the length of the asynchronous partition 6). This reduction in seek distance and associated seek time improves performance by facilitating the time constraints of the isochronous partitions 8A and 8B. It also improves performance with respect to the asynchronous partition 6 by allowing more asynchronous data to be transferred to the host computer before having to seek back to the isochronous partition to satisfy the isochronous time constraints.

FIG. 4A illustrates the average random seek distance 22 when seeking between the isochronous and asynchronous partition for the prior art disk drive of FIG. 1. On average, the disk drive of FIG. 1 will access isochronous data 24 near the middle of the isochronous partition, and access asynchronous data 26 near the middle of the asynchronous partition. Thus, the average random seek distance 22 when seeking between isochronous and asynchronous data requires one-half a stroke of the actuator arm.

FIG. 4B illustrates how in the embodiment of FIG. 2 locating the asynchronous partition 6 between two isochronous partitions 8A and 8B significantly reduces the average random seek distance 28A and 28B when seeking between the isochronous and asynchronous partitions. In an embodiment wherein the isochronous partitions 8A and 8B are equal and the asynchronous partition 6 is significantly smaller than the isochronous partitions 8A and 8B, the average random seek distance 28A and 28B is essentially reduced to only one-quarter a stroke of the actuator arm (plus one-quarter the length of the asynchronous partition 6). This significant reduction in the average random seek distance improves performance in satisfying the isochronous time constraints and improves access to the asynchronous partition 6 by allowing more asynchronous data to be transferred to the host computer before having to seek back to the isochronous partition to satisfy the isochronous time constraints.

FIG. 5A illustrates the maximum seek distance 30 when seeking between the ends of the isochronous partition for the prior art disk drive of FIG. 1. The maximum seek distance 30 when concurrently accessing two AV streams 32A and 32B (in an interleaved manner) extends from one end of the isochronous partition to the other end. FIG. 5B illustrates that the maximum seek distance 34 for the disk drive of FIG. 2 when concurrently accessing two AV streams 36A and 36B. The maximum seek distance 34 extends through the asynchronous partition 6 from one end of the first isochronous partition 8A to the other end of the second isochronous partition 8B requiring the entire stroke of the actuator arm. In one embodiment, the size of the asynchronous partition 6 is substantially smaller than the isochronous partitions 8A and 8B such that the maximum seek distance is not significantly greater than the prior art of FIG. 5A. In an embodiment wherein the size of the asynchronous partition 6 is significant, the AV streams are stored in the isochronous partitions 8A and 8B to minimize the probability of concurrently accessing two streams in separate partitions. For example, related AV streams likely to be accessed together are stored in the same isochronous partition 8A or 8B so that the maximum seek distance 38A or 38B does not extend through the asynchronous partition 6.

FIG. 6A illustrates the average random seek distance when seeking between two AV streams stored in the isochronous partition for the prior art disk drive of FIG. 1. In the example of FIG. 6A, the disk drive is seeking between an AV stream 40 located in the middle of the isochronous partition, and an AV stream 42A or 42B located at an end of the isochronous partition. The average random seek distance 44A or 44B equals one-half the length of the isochronous partition. In an embodiment wherein the asynchronous partition is significantly smaller than the isochronous partition, the average random seek distance 44A or 44B is essentially one-half a stroke of the actuator arm.

FIG. 6B illustrates the average random seek distance when seeking between two AV streams stored in separate as well as the same isochronous partition for the disk drive of FIG. 2. When the AV streams 46A and 46B are stored in separate partitions, the average random seek distance 48 equals one half a stroke of the actuator arm plus one-half the length of the asynchronous partition 6. Thus, in an embodiment wherein the asynchronous partition 6 is significantly smaller than the isochronous partitions 8A and 8B, the average random seek distance 48 is essentially the same as in FIG. 6A. When the AV streams are in the same partition (e.g., AV streams 46A and 50), the average random seek distance 52 is reduced to one-half the length of the isochronous partition 8A. In an embodiment wherein the isochronous partitions 8A and 8B are equal and the size of the asynchronous partition 6 is significantly smaller than the isochronous partitions 8A and 8B, the average random seek distance 52 is half the distance of the average random seek distance 44A or 44B in FIG. 6A. In an embodiment wherein the size of the asynchronous partition 6 is significant, the AV streams are stored in the isochronous partitions 8A and 8B to minimize the probability of concurrently accessing two streams in separate partitions.

We claim:

1. A disk drive comprising:
   (a) a disk comprising a plurality of tracks, an asynchronous partition, and a first and second isochronous partition, wherein:
     the asynchronous partition comprises a first plurality of contiguous tracks for storing a plurality of files comprising asynchronous data;
     the first isochronous partition comprises a second plurality of contiguous tracks for storing a plurality of files comprising isochronous data;
     the second isochronous partition comprises a third plurality of contiguous tracks for storing a plurality of files comprising isochronous data; and
     the asynchronous partition is located between the first and second isochronous partitions in order to reduce the seek time for the disk drive when seeking between the asynchronous and isochronous partitions;
   (b) a head actuated radially over the disk; and
   (c) a disk controller for writing the isochronous data to and reading the isochronous data from the first and second isochronous partitions according to a time-constrained protocol, and for writing the asynchronous data to and reading the asynchronous data from the asynchronous partition according to a best-effort protocol.

2. The disk drive as recited in claim 1, wherein the time-constrained protocol employs the AV/C protocol, and the best-effort protocol employs the SBP-2 protocol.

3. The disk drive as recited in claim 1, further comprising offset parameters for identifying the beginning and end of the asynchronous partition.

4. The disk drive as recited in claim 3, wherein the offset parameters comprise a first parameter identifying the beginning of the asynchronous partition and a second parameter identifying the end of the asynchronous partition.

5. The disk drive as recited in claim 3, wherein the offset parameters comprise a first parameter identifying the beginning of the asynchronous partition and a second parameter identifying the size of the asynchronous partition.

6. The disk drive as recited in claim 1, wherein the disk comprises an AV file system for accessing the isochronous data.

7. A method of accessing a disk drive, the disk drive comprising a disk and a head actuated radially over the disk, the disk comprising a plurality of tracks, an asynchronous partition comprising a first plurality of contiguous tracks for storing a plurality of files comprising asynchronous data, a first isochronous partition comprising a second plurality of contiguous tracks for storing a plurality of files comprising isochronous data, and a second isochronous partition comprising a third plurality of contiguous tracks for storing a plurality of files comprising isochronous data, the method comprising the steps of:

(a) using a time-constrained protocol to read the isochronous data from at least one of the first and second isochronous partitions; and (b) using a best-effort protocol to read the asynchronous data from the asynchronous partition;

wherein the asynchronous partition is located on the disk between the first and second isochronous partitions in order to reduce the seek time for the disk drive when seeking between the asynchronous and isochronous partitions.

8. The method of accessing a disk drive as recited in claim 7, wherein the time-constrained protocol employs the AV/C protocol, and the best-effort protocol employs the SBP-2 protocol.

9. The method of accessing a disk drive as recited in claim 7, wherein the step of reading the isochronous data utilizes offset parameters for identifying the beginning and end of the asynchronous partition.

10. The method of accessing a disk drive as recited in claim 9, wherein the offset parameters comprise a first parameter identifying the beginning of the asynchronous partition and a second parameter identifying the end of the asynchronous partition.

11. The method of accessing a disk drive as recited in claim 9, wherein the offset parameters comprise a first parameter identifying the beginning of the asynchronous partition and a second parameter identifying the size of the asynchronous partition.

12. The method of accessing a disk drive as recited in claim 7, wherein the step of reading the isochronous data utilizes an AV file system stored on the disk.

* * * * *